US011777596B2

(12) United States Patent
Pickering et al.

(10) Patent No.: US 11,777,596 B2
(45) Date of Patent: Oct. 3, 2023

(54) OPTIMISATION FOR DATA TRANSMISSION

(71) Applicant: Airbus Defence and Space Limited, Stevenage (GB)

(72) Inventors: Yvonne Pickering, Portsmouth (GB); Stephen Brown, Portsmouth (GB); Peter Skinner, Portsmouth (GB)

(73) Assignee: AIRBUS DEFENCE AND SPACE LIMITED, Stevenage (GB)

( * ) Notice: Subject to any disclaimer, the term of this patent is extended or adjusted under 35 U.S.C. 154(b) by 0 days.

(21) Appl. No.: 17/796,972

(22) PCT Filed: Jan. 22, 2021

(86) PCT No.: PCT/EP2021/051443
§ 371 (c)(1),
(2) Date: Aug. 2, 2022

(87) PCT Pub. No.: WO2021/156076
PCT Pub. Date: Aug. 12, 2021

(65) Prior Publication Data
US 2023/0057895 A1 Feb. 23, 2023

(30) Foreign Application Priority Data
Feb. 4, 2020 (EP) ...................... 20155446

(51) Int. Cl.
*H04W 76/20* (2018.01)
*H04B 7/185* (2006.01)
*H04L 1/00* (2006.01)
*H04W 28/06* (2009.01)

(52) U.S. Cl.
CPC ....... *H04B 7/18582* (2013.01); *H04L 1/0003* (2013.01); *H04W 28/06* (2013.01)

(58) Field of Classification Search
CPC ... H04L 1/0003; H04L 1/0009; H04L 1/0083; H04L 1/0002; H04B 7/18582
See application file for complete search history.

(56) References Cited

U.S. PATENT DOCUMENTS

| 10,305,580 | B1* | 5/2019 | Lee | H04B 7/0626 |
| 11,558,109 | B2* | 1/2023 | Duyck | H04B 7/204 |
| 2008/0049659 | A1* | 2/2008 | Ram | H04L 1/0003 370/316 |
| 2010/0061399 | A1 | 3/2010 | Li | |
| 2017/0230105 | A1* | 8/2017 | Baudoin | H04B 7/18521 |

(Continued)

OTHER PUBLICATIONS

Apr. 26, 2021 Search Report issued in International Patent Application No. PCT/EP2021/051443.

(Continued)

*Primary Examiner* — Syed Ali
(74) *Attorney, Agent, or Firm* — Nelson Mullins Riley & Scarborough LLP

(57) ABSTRACT

An optimisation method is presented for the transmission of data along any radio frequency link which can be split into distinct transmission blocks, an example being a beam hopping system. By reordering the packets to be transmitted, it is possible to send packets either at, or nearer to, their optimal modulation and encoding configuration. This will allow for a higher bit to symbol conversion for the majority of packets and hence more data bits can be sent for the same number of symbols.

15 Claims, 3 Drawing Sheets

(56) References Cited

U.S. PATENT DOCUMENTS

| | | | | |
|---|---|---|---|---|
| 2018/0278324 A1* | 9/2018 | Qin | ........................ | H04H 20/74 |
| 2019/0044612 A1* | 2/2019 | Mundra | ............. | H04B 7/18543 |
| 2019/0089570 A1* | 3/2019 | Li | ....................... | H04L 27/2692 |
| 2020/0244350 A1* | 7/2020 | Rosenberg | ......... | H04B 7/18543 |
| 2020/0358704 A1* | 11/2020 | Anafi | .................. | H04L 47/2441 |
| 2021/0036766 A1* | 2/2021 | Keshet | ............... | H04B 7/18513 |
| 2021/0344415 A1* | 11/2021 | Simoens | ............ | H04B 7/18513 |

OTHER PUBLICATIONS

Apr. 26, 2021 Written Opinion of the International Searching Authority issued in International Patent Application No. PCT/EP2021/051443.

\* cited by examiner

OPTIMISATION FOR DATA TRANSMISSION

CROSS-REFERENCE TO RELATED APPLICATIONS

This application claims priority to and is a 35 U.S.C. § U.S. National Stage Application of International Application No. PCT/EP2021/051443, entitled "OPTIMISATION FOR DATA TRANSMISSION", filed Jan. 22, 2021, which claims priority to European Application No. 20155446.6, entitled "OPTIMISATION FOR DATA TRANSMISSION", filed Feb. 4, 2020, the contents of each being incorporated by reference herein in its entirety.

TECHNICAL FIELD

The present invention relates to preparation of data for transmission, and particularly, but not exclusively, to radio frequency transmission of data via a beam hopping scheme.

BACKGROUND OF INVENTION

In many communication systems, several different geographic areas can be served by a single satellite which transmits data over a downlink to each geographic area in turn, via a sequence of short transmission bursts.

For data transmission, an antenna of such a satellite is controlled according to a beam-hopping sequence which defines the set of geographic coverages, representing the areas, or cells, on Earth which are covered by a particular satellite beam transmitted from the antenna at a particular time, and a corresponding set of dwell times defining the period of time for which the satellite beam should maintain a particular geographical coverage. Appropriate control of beamforming networks in the satellite leads to the transmission beam being switched or redirected towards the next cell in the sequence, for a corresponding dwell time. Switching continues in this manner until the end of the predefined sequence, at which point the sequence is restarted in the absence of an instruction to the contrary.

In this manner, a number of different ground stations at different respective locations may be in communication with the same satellite on a time division basis, ensuring all of the locations can be served by the available hardware in the satellite communications system. The switching is typically rapid, with dwell times of the order of a few milliseconds, and the switching can be employed in conjunction with power or spectrum management in order to share service resources among different regions efficiently.

In the example described above, the antenna switching sequence may be referred to as a beam hopping sequence (BHS), in which a satellite beam is "hopped" between coverage areas, or cells, based on a predetermined sequence of dwell times.

Within a particular cell, requirements of different users may differ. In some transmission systems, no optimisation is carried out to account for such variations. A common modulation and encoding (MODCOD) scheme of high robustness will used for transmissions across all geographical areas, with the result that the some data will be transmitted at a sub-optimal low-efficiency MODCOD.

A MODCOD may be defined by a number of different parameters, such as a modulation type and degree of forward error correction, and is typically characterised in terms of robustness, at the expense of transmission spectral efficiency.

For ground station terminals experiencing good transmission conditions, such as clear skies, for example, or where the terminal has a large antenna area, it may be beneficial to use a MODCOD having lower robustness since the likelihood of errors caused due to transmission conditions is reduced, and high robustness may be unnecessary—spectral efficiency can be improved as a result. For terminals experiencing poor transmission conditions, such as heavy cloud cover, or where the terminal has a small antenna area, it may be beneficial to use a more robust MODCOD using a greater number of symbols to ensure correct transmission of data.

To solve the problem of use of a sub-optimal MODCOD, it may be possible to introduce a form of optimisation to ensure that data is transmitted at a MODCOD appropriate for a particular user. Theoretically, this may be achieved by considering a required MODCOD on a per-packet basis, and taking appropriate action, but this is unlikely to be feasible in practical implementations, due to the computational complexity and delay associated with this process, conflicting with the time available as a result of the required data transmission rate. For this reason, preferred current solutions are simply to omit optimisation, and to insert data packets into transmission frames in the order in which they are arranged at a transmission source, accepting the MODCOD inefficiencies.

Embodiments of the present invention aim to address such inefficiencies by transmitting data packets at, or near their optimal MODCOD, in a way which is not computationally prohibitive, for ensuring high transmission rates needed by modern communications systems.

SUMMARY OF INVENTION

According to an aspect of the present invention, there is provided a method of optimising data for transmission comprising: determining a plurality of data packets to be transmitted at a first transmission rate; determining required modulation and encoding schemes, MODCODs, for bits of the plurality of data packets; assigning bits to a respective baseband transmission frame, BBFRAME, of a sequence of a plurality of BBFRAMEs, in accordance with the required MODCODs for the respective bits, such that: (i) each BBFRAME is associated with the highest common MODCOD robustness of the MODCODs required for each of the bits in the BBFRAME; and (ii) the robustness of the MODCOD associated with each BBFRAME increases or decreases in accordance with the chronological position in the sequence of the BBFRAMEs; and determining a sequence of data packets of the plurality of data packets to be arranged within the BBFRAME sequence in accordance with the assignment of bits to BBFRAMEs, and outputting the sequence of data packets to a buffer for arrangement as a transport stream comprising the sequence of BBFRAMEs The data transmission may be arranged to occur during a dwell time of a beam hopping schedule of a communications system using a predetermined number of symbols.

The method may further comprise determining whether a BBFRAME has capacity to accommodate bits of the plurality of data packets; if the BBFRAME has capacity, assigning the bits to the BBFRAME; and if the BBFRAME does not have capacity and the dwell time is not filled, assigning the bits to an adjacent BBFRAME in the sequence of BBFRAMEs.

The method may further comprise determining that it is not possible to accommodate one or more additional bits of the plurality of data packets in the sequence of BBFRAMEs; determining that optimisation of the sequence of BBFRAMEs is possible if an optimisation limit is not exceeded, the optimisation comprising: identifying further data packets to be transmitted during the dwell time at a second transmission rate higher than the first transmission rate; adding further BBFRAMEs to the sequence of BBFRAMEs within the dwell time; and assigning bits of the data packets and the further data packets to the sequence of BBFRAMEs and further BBFRAMEs, in accordance with the required MODCODs for the bits.

The method may further comprise repeating the optimisation until the optimisation limit is reached.

The optimisation limit may be the bit-to-symbol conversion rate limit for the dwell time.

The optimisation limit may be a predetermined number of optimizations, if the bit-to-symbol conversion rate limit for the dwell time is not exceeded.

The method may further comprise: identifying the MODCOD of each BBFRAME; preparing a transmission stream based on the sequence of data packets to be arranged in the sequence of BBFRAMEs and the MODCOD of each BBFRAME; and transmitting the transmission stream.

The data packets in a BBFRAME may be arbitrary.

The required MODCOD of each data packet may be contained within the data packet.

According to another aspect of the present invention, there is provided an apparatus comprising one or more processors, and memory storing computer-executable instructions that, when executed by the one or more processors, causes the method described above to be performed.

According to another aspect of the present invention, there is provided a satellite payload comprising the above apparatus.

According to another aspect of the present invention, there is provided a computer program which, when executed by a processor, is arranged to cause the method described above to be performed.

By reordering packets in the manner described above, it is possible to send packets either at, or near to, their optimal MODCOD. This will allow for a higher bit-to-symbol conversion rate for the majority of packets, and hence more data bits can be sent for the same number of symbols, increasing system throughput.

BRIEF DESCRIPTION OF DRAWINGS

Embodiments of the present invention will be described, by way of example only, in connection with the following drawings, of which.

DETAILED DESCRIPTION

Figure 1:
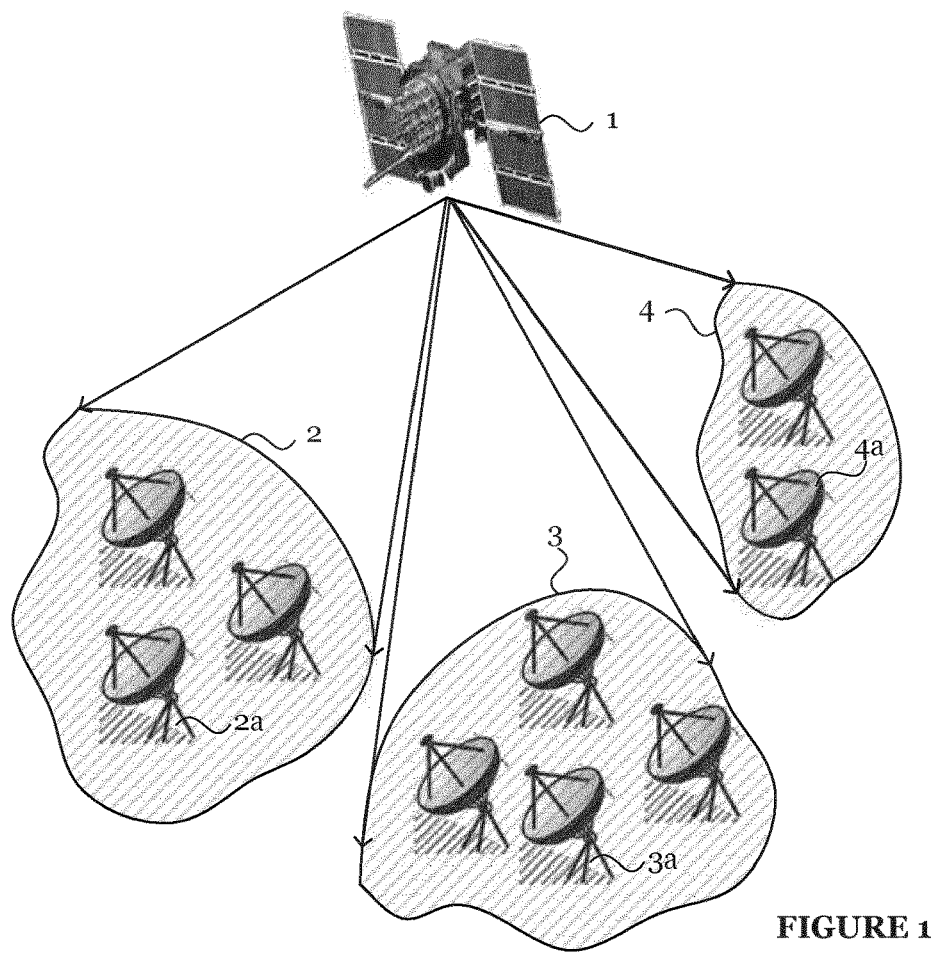
FIG. 1 illustrates a beam hopping system in which optimisation is performed according to embodiments of the present invention.

Embodiments of the present invention are described in relation to the preparation of a data stream for transmission over a radio frequency (RF) downlink from a satellite 1 to a plurality of ground stations 2a, 3a, 4a. The data stream may represent content, such as audio, video, image information, or other consumable data, and in the embodiment illustrated in FIG. 1, the data is provided to a plurality of user terminals as ground stations in each of a plurality of different cells 2, 3, 4 on a time division basis using a beam hopping scheme.

In embodiments of the present invention, the preparation of a transmission stream involves the ordering of frames of data for transmission. The data in the ordered frames modulates a predetermined carrier signal used in the satellite downlink using a set of symbols associated with the modulation system required by the transmission data.

The ordering process involves an optimisation method, described in more detail below, which is performed on baseband data, prior to its frequency upconversion during the preparation of a transport stream, in order to ensure efficient transmission.

In embodiments of the present invention, data for transmission is arranged in a sequence of data fields referred to herein as baseband frames (BBFRAMEs). Each BBFRAME comprises a plurality of data bits, and the sequence of BBFRAMEs fills a dwell time in the beam hopping scheme.

Data packets, comprising a plurality of bits, are requested from a buffer. The sequence of BBFRAMEs is filled, in chronological order, with bits from the buffer having similar MODCODs, instead of the order being random. Once the dwell time has been filled, optimisation methods of embodiments of the present invention will determine whether it is possible to add more bits to the dwell time as a result of an increased bit-to-symbol conversion rate deriving from the MODCOD grouping. The optimisation method is capable of optimising over as many BBFRAMEs as are required.

The result of the optimisation is therefore a mapping between bits and BBFRAMEs. enabling data packets to be selected and arranged in the BBFRAME sequence. The arrangement of data packets is used to form the transmission frames.

Figure 2:
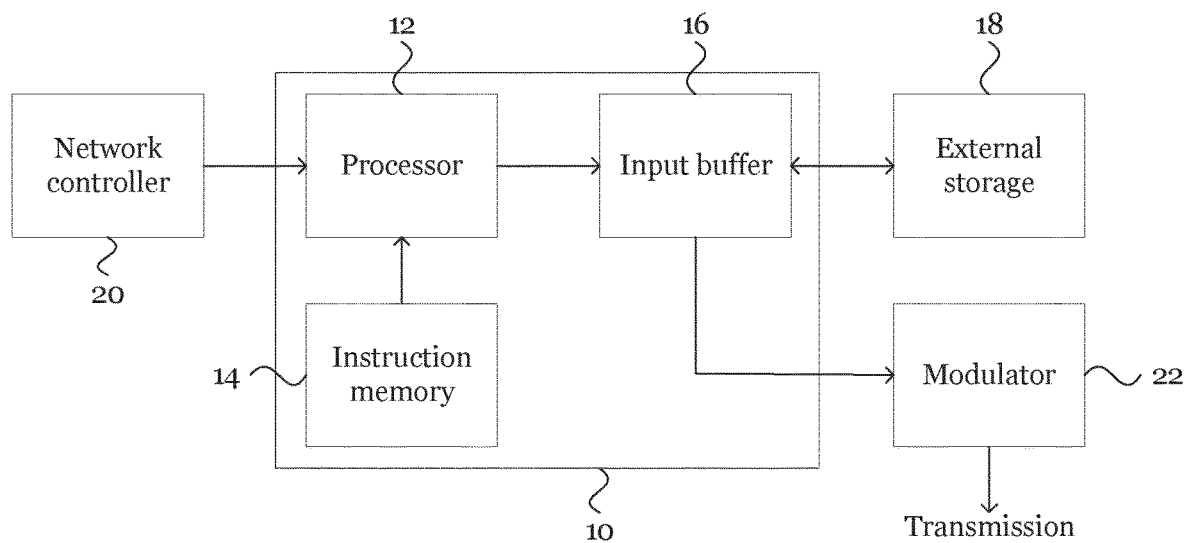
FIG. 2 illustrates an optimisation system according to embodiments of the present invention.

The optimisation method, described below, is performed on a satellite payload. FIG. 2 illustrates the architecture of an optimisation system 10 according embodiments of the present invention.

The system comprises a processor 12, which may be a central processing unit or may include a set of distributed processors, which executes a computer program comprising computer-readable instructions in order to perform the method of embodiments of the present invention. The computer-readable instructions to be executed are stored in a memory 14, such as a non-volatile memory (e.g. a read-only memory (ROM)) or a random access memory (RAM) to be accessed by the processor. The processor may be implemented as an application-specific integrated circuit (ASIC).

The optimisation system 10 comprises an input buffer 16. The input buffer may 16 be any suitable memory, such as a volatile memory, and data is written into and read from the input buffer 16 under the control of the processor 12.

External to the optimisation system 10 is data storage 18 which stores data packets to be transmitted. The data storage 18 may comprise one or more content servers, for example, which store content to be provided to a number of user terminals. The processor 12 operates to retrieve data packets from the external data storage 18 and to store the retrieved packets in the input buffer 16. In alternative embodiments, the data storage may be contained within the optimisation system 10.

The input buffer 16 stores the total number of bits which are to be inserted into a sequence of BBFRAMEs. When data packets are first retrieved from the external storage 18, there is no assignment of data to the BBFRAMEs, and as described below in more detail, an initialisation state is adopted in the sequence of BBFRAMEs is filled with bits based on MODCOD order.

The dwell time of the beam hopping scheme is predetermined and is provided to the processor 12 by an external network controller 20 which controls a satellite for transmission. The processor 12 is therefore able to determine the number of physical layer frames (PLFRAMEs) which will fit within the dwell time, for a given transmission rate and for given BBFRAME MODCODs. Based on this, the number of bits which can be accommodated within a BBFRAME can be determined by the processor 12.

As described in more detail below, the processor 12 executes an optimisation method in order to refine the BBFRAME sequence from the initialisation state by adding further bits to be transmitted, and to make further refinements in an iterative process. The iterations are such that the transmission rate, the number of BBFRAMEs in the dwell time, and the corresponding number of data packets to be transmitted, can be increased without violating the required modulation and encoding scheme of the data packets in the transmission.

Once the optimisation method is complete, the processor 12 controls the provision of the bits and their respectively assigned BBFRAMEs to a modulator 22. With the knowledge of how many bits at each MODCOD should be assigned to each BBFRAME, as output by the optimisation process, the modulator 22 prepares a transport stream by assigning data packets based on how many bits they contain, and the BBFRAME they fall into (identified via a BBFRAME ID or checksum, for example) given their required MODCOD, and by modulating a predetermined carrier signal. The modulator 22 is shown outside of the optimisation system 10 of FIG. 2, but in alternative embodiments may be inside the optimisation system 10.

Conventional transmission MODCODs, and their robustness, are to be found in section 6 of the European Telecommunications Standards Institute (ETSI) standard EN 302 307-1 and 307-2, and would be well understood to those skilled in the art. Examples are phase shift keying (PSK) modulation schemes employing a variety of symbol constellations. The aforementioned ETSI standard also details the process of physical layer framing for transmission, prior to frequency modulation, with physical layer frames (PL-FRAMES) being constructed from BBFRAMEs to which error correction (e.g. forward error correction) is applied. As such, the transmission of data packets in a particular sequence of BBFRAMEs is considered to be well known in the art, and the transmission stages are not essential to embodiments of the present invention.

The transmission is executed by providing the transport stream to a transmission interface for a satellite, comprising a plurality of beamforming networks which control transmission of data in the dwell, before executing switching to the next cell coverage area in the next dwell.

The processor 12 may, in some embodiments, be implemented in a satellite payload, interfacing with an on-board controller of the satellite payload. In such embodiments, the data packets to be transmitted may be received from a ground-based storage, either via the uplink of the satellite payload, or via one or more other satellites in a constellation via inter-satellite links.

The processor 12 may, in other embodiments, be implemented in a ground station, accessing terrestrial external data storages to provide content for transmission. In such embodiments, the data packets, once ordered optimally in the BBFRAME sequence, are provided to a satellite via an uplink for distribution.

The optimisation method performed by the processor 12 may be performed during a time slot prior to commencement of the servicing of a particular cell in the beam hopping scheme. Such a time slot may occur while the satellite is involved in servicing a different cell within the beam hopping scheme.

The beam hopping scheme which is executed by the satellite may change in accordance with scheduled or dynamically-determined changes to account for environmental variations, for example. When the scheme changes, the dwell time may change, which may require further iterations to be performed so to reflect a modified dwell time.

Figure 3:
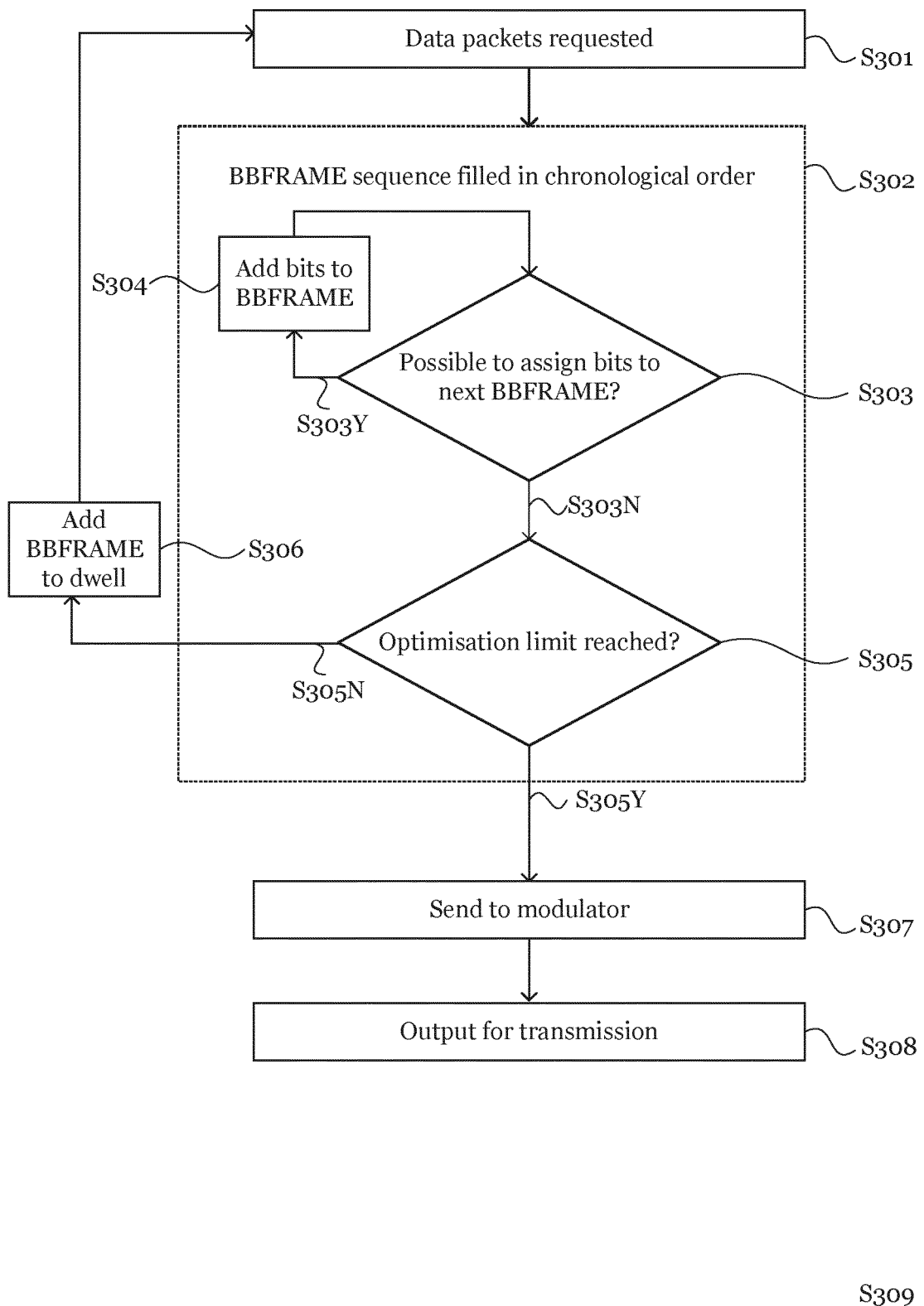
FIG. 3 illustrates an optimisation method according to embodiments of the present invention.

FIG. 3 illustrates an optimisation method according to embodiments of the present invention. The method is implemented as an algorithm executed by the processor 12 shown in FIG. 2.

In step S301, data packets are requested from external data storage 18 containing data for transmission and stored in the input buffer 16. A bit histogram is constructed from the requested data packets, which represents the number of bits associated with a particular MODCOD (expressed in order of, for example, a robustness parameter).

In step S302 bits of the data packets are added to a sequence of BBFRAMES in a filling process, by taking bits associated with a particular bar from the histogram and testing whether the number of bits can be added to the total number of bits in the BBFRAME. By selecting bits from a particular histogram bar, the bits to be added to a particular BBFRAME will have a similar MODCOD, as associated with the histogram bar.

The MODCOD required by a particular packet may be contained within the data packet itself, such as in the packet header, defined by the terminal for which the data packet is destined. In alternative embodiments, the required MODCOD may be provided to the optimisation system as a setting (e.g. a setting for a particular ground station terminal), to be accessed via a lookup table in correlation with the identity of the terminal scheduled to receive the data packet.

In some embodiments, the grouping of bits of similar MODCOD is such that the MODCOD of each BBFRAME increases in robustness, relative to a previous BBFRAME in the sequence. In other embodiments, the grouping of bits of similar MODCOD is such that the MODCOD of each BBFRAME decreases in robustness, relative to a previous BBFRAME in the sequence. Transmission requirements determine whether increasing MODCOD or decreasing MODCOD is required for the sequence of BBFRAMEs.

The filling process continues by adding bits to the next BBFRAME once a particular BBFRAME is full. In some embodiments, each BBFRAME is filled completely as bits from a particular data packet can span a BBFRAME boundary, in a process referred to herein as "BBFRAME spanning". In alternative embodiments, BBFRAME spanning is not used.

Within step S302, a series of tests is performed as part of the filling process, as described below. At step S303, it is determined whether it is possible to add bits to the total number of bits in the last BBFRAME in the sequence, based on the capacity of the BBFRAME and the number of bits already filling it. If the BBFRAME has capacity to accommodate further bits (S303Y), the bits are added to the total number of bits in that BBFRAME in step S304, and the process returns to step S303 where it is repeated in relation to the further bits from the input buffer.

If it is determined in S303 that the BBFRAME does not have capacity to accommodate the bits (S303N), the method proceeds to step S305, where it is determined whether an optimisation limit has been reached, beyond which an optimisation function will not be able to produce a more optimal solution than the previous optimisation has found, and/or at which a maximum processing time for the optimisation process, specified as a system requirement, has been reached. At the optimisation limit, ends and the most optimal solution is chosen as the order in which the data is to be transmitted.

The optimisation limit may, in some embodiments, represent either a predetermined number of iterations (for example, four) of the optimisation, or may, in other embodiments, represent the bit-to-symbol conversion rate limit. Where bit-to-symbol conversion is used as the basis of the determination in step S305, it determined whether the number of symbols associated with the dwell time of the transmission system is exceeded by the addition of one or more BBFRAMEs.

If further optimisation is possible (S305N), the method continues to step S306, at which a new BBFRAME is added to the sequence of BBFRAMEs, and the process returns to step S301 where new bits are added to the new BBFRAME sequence.

If no further optimisation (S305Y) is possible, it is determined that the dwell time of the transmission has been filled by bits from the input buffer, and the process proceeds to S307, where the mapping of bits to BBFRAMEs is used to determine the sequence of data packets from the input buffer 16 to be arranged within the BBFRAMEs. The packet sequence is sent to the modulator.

As a result of the MODCOD-based ordering of bits, the bit-to-symbol conversion rate for transmission of the bits will, on average have increased in comparison to an unordered sequence. This occurs because the sequence of BBFRAMEs is such that there are more BBFRAMEs which are transmitted at a MODCOD which is more efficient/less robust than would be the case if there had been no MODCOD grouping based on the bit histogram, and the increased efficiency of such BBFRAMEs is associated with a reduced proportion of the dwell time.

In comparison to a sequence of BBFRAMEs containing bits in which the MODCOD robustness varies in an arbitrary manner across the entire BBFRAME sequence, the MODCOD of each BBFRAME might be associated with a relatively high robustness due to the fact that each BBFRAME takes the highest common robustness MODCOD of the bits within it. Consequently, transmission spectral efficiency for BBFRAMEs which are not in MODCOD order is relatively low, in comparison with that achieved by the optimisation method of embodiments of the present invention, due to the higher robustness required, and the need for more symbols for a particular number of bits.

Consequently, the number of symbols any particular transmission needs to use, as a result of embodiments of the present invention, will decrease. The increased efficiency means that the required transmission time is now smaller, and thus, it is possible to fit more transmission packets into the available dwell time, using the same number of symbols. The available transmission rate is therefore increased, dependent on the determined bit-to-symbol conversion rate of the optimised BBFRAME sequence. More bits can be requested from the input buffer for transmission, and the process returns to step S301.

In step S305Y, information is sent to the modulator representing the final arrangement of BBFRAMEs in terms of the number of bits in each BBFRAME, and the MODCOD associated with each BBFRAME.

In step S307, data packets are selected from the input buffer 16, and assigned to a BBFRAME of the transmission as determined in the final optimisation step S306 of the method. The selection of packets is such that each BBFRAME of the sequence of BBFRAMEs can be considered to be associated with a MODCOD, which is the highest common robustness, or lowest common transmission spectral efficiency, of the MODCODs required by each of the data packets assigned to that BBFRAME. Since data packets of similar MODCOD are grouped together, it may be the case, in some embodiments, that the overall MODCOD of the BBFRAME to which groups of data packets are assigned does not vary significantly from any of the data packets within the BBFRAME.

The assignment of data packets to BBFRAMEs is sent to the modulator where the transmission stream is prepared. In the event that a sequence of BBFRAMEs does not fully fill the dwell time, but in which it is not possible to add a further BBFRAME, dummy symbols may be added to the transmission to fill the dwell time.

In Step 308, the modulator 22 prepares a transmission stream as symbols of a carrier wave having preselected transmission characteristics (e.g. frequency).

If BBFRAME spanning is not used, the BBFRAMEs do not need to be transmitted in the order of the sequence determined by the optimisation method, as the BBFRAME ordering is for the purpose of efficient grouping of the MODCODs of the bits, as described above. Once data packets are assigned to a particular BBFRAME, the BBFRAMEs can be transmitted in any order, since the improvement of the improved grouping of the data packets applies irrespective of the transmission order of the groups themselves. It will be appreciated that this does not apply if BBFRAME spanning is used, as transmitted data packets must arrive in order to be assembled. In the case where BBFRAME spanning is not used, when packets are assigned to BBFRAMEs, dummy bits may also need to be added to each BBFRAME in cases where a data packet does not exactly fill the whole BBFRAME.

The transmission step itself need not be part of embodiments of the invention and can be performed by external systems receiving an assignment of bits to BBFRAMEs, but other embodiments may include the transmission stage.

The assignment of bits to BBFRAMEs avoids the need to physically move data packets in the buffer into a particular order as part of the optimisation process itself. This would otherwise be computationally expensive. Consequently, it is possible to iterate the optimisation procedure by updating only the number of bits at each MODCOD, and only once the final mapping is known are BBFRAMEs assembled. The allocation of bits on the histogram to the appropriate BBFRAME removes the need to sort packets unnecessarily.

An advantage of the method described is that the data packets do not need to be arranged individually in MODCOD order. The BBFRAMEs are sent in MODCOD order, but within a given BBFRAME, the data packets may be arranged in any order, including an arbitrary order. This flexibility greatly reduces the computational time of the method, as no computational resources are required to order the packets within the BBFRAMEs.

Techniques according to embodiments of the present invention can be shown to increase transmission efficiency, by over 50% in some cases, in terms of the quantity of data transmitted in a fixed time, in comparison to techniques as described in the introduction for the application, in which no packet re-ordering is applied.

Although embodiments of the present invention are described in connection with a beam hopping system, this is simply an example, and the optimisation method described above can be applied to transmission of data along any RF link which can be split into distinct transmission blocks.

FIG. 4 illustrates an example of the structure of a data stream, achieved using the method described in FIG. 3. In the embodiments of FIG. 4, the data stream to be transmitted may be a logical data stream conforming to the Digital Video Broadcast—Second Generation Terrestrial standard (DBV-T2). As described above, the data stream which is ultimately transmitted is divided into a series of PLFRAMEs, formed from FECFRAMEs which are in turn formed from BBFRAMEs to which forward error correction check bits are added, using e.g. a low-density parity-check (LDPC) or Bose-Chaudhuri-Hocquenghem (BCH) code, as known in the art.

For a given transmission rate, the FECFRAMEs are of a predetermined bit length, determined by system requirements. The length of a PLFRAME is dependent on a particular MODCOD associated with the data packets within the BBFRAME of the FECFRAME which forms the PLFRAME, and is dependent on the ratio of bits in the FECFRAME (based on the number of data bits and the required encoding bits) to symbols. Consequently, as the method of FIG. 3 proceeds to perform optimisation, the length of a PLFRAME can be shortened by increasing the number of data packets to be transmitted with a lower-robustness and higher-efficiency MODCOD, such that a higher ratio of symbols to FEC bits can be used in comparison with an initial configuration state prior to optimisation. As a result of the shortening of the PLFRAMEs, it becomes possible to fit more PLFRAMEs within the dwell time, which in turn enables more data packets to be assigned respectively to more BBFRAMEs.

Figure 4A:
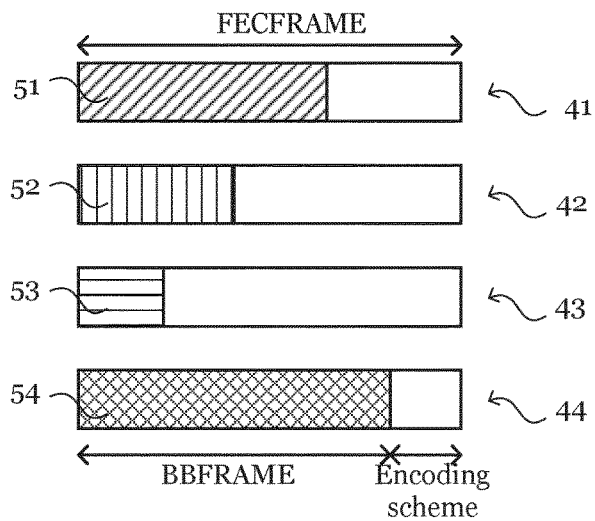
FIG. 4 illustrates an example of a data stream optimised according to embodiments of the present invention.
Figure 4A:
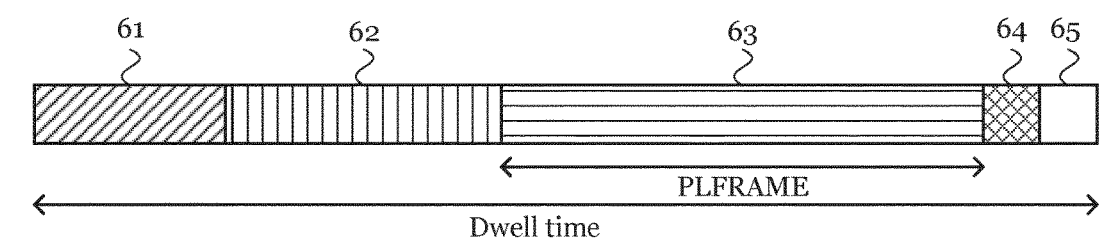

Consider an example in which four FECFRAMEs 41, 42, 43, 44 can be constructed using bits filling four BBFRAMEs 51, 52, 53, 54, as shown in FIG. 4(a). In this example, BBFRAME spanning is used and the BBFRAMEs are full. Each BBFRAME is associated with the highest robustness of the MODCODs required by the bits within the BBFRAME. Since the FECFRAME length is fixed, and since the error correction data to be added to the BBFRAME is dependent on the MODCOD associated with the BBFRAME, the maximum number of bits which the BBFRAME can contain is limited in dependence upon the MODCOD of the BBFRAME. A stream of PLFRAMEs 61, 62, 63, 64 is constructed, with dummy symbols 65 added to fill the dwell time.

The length of PLFRAMEs 61, 62, 63, 64 are not shown to scale. In practice, a PLFRAME will not be longer than the corresponding FECFRAME as the most robust MODCOD has a bit to symbol conversion ratio of 1:1. For the case where this ratio is 1:1, the PLFRAME is the same length as the FECFRAME. It can be seen that PLFRAME 64, which contains bits associated with BBFRAME 54, is of the shortest duration as it is associated with the smallest amount of encoding, and PLFRAME 63 is of the longest duration as it is associated with a higher order modulation scheme.

After optimisation based on one iteration in the method of FIG. 3, the length of the PLFRAMEs is shortened as it is possible to use a higher transmission rate. The higher transmission rate is made possible because of the higher bit to symbol rate, as described above. As the length of the PLFRAMEs are shortened, it is possible to accommodate more PLFRAMEs in the same dwell time.

Figure 4B:
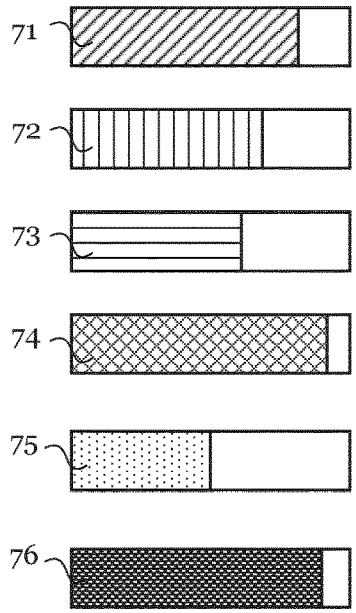
Figure 4B:
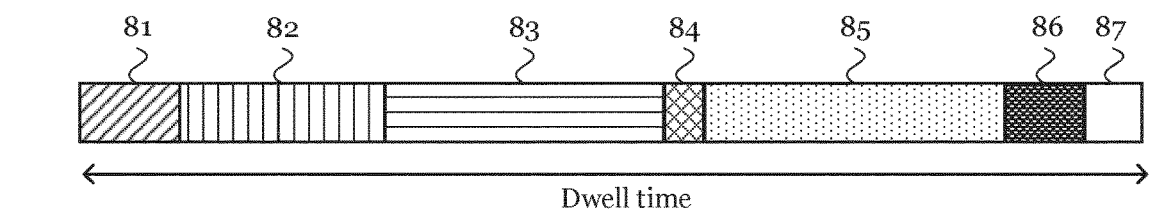

FIG. 4(b) shows an example in which six BBFRAMEs 71, 72, 73, 74, 75, 76 can now be included in the transmission stream, via six PLFRAMEs 81, 82, 83, 84, 85, 86. Again the PLFRAMEs are not shown to scale, but their length is dependent on the bit to symbol conversion of the FECFRAME length. The proportion of the PLFRAME taken up by error code is reduced. Again, dummy symbols 87 are used to fill the dwell time.

It will be appreciated that the present invention is not limited to the embodiments described above, and modifications will be apparent which fall within the scope of the invention defined by the following claims.

The invention claimed is:

1. A method of optimizing data for transmission, the method comprising:
    determining a plurality of data packets to be transmitted at a first transmission rate;
    determining required modulation and encoding schemes (MODCODs) for bits of the plurality of data packets;
    assigning the bits of the plurality of data packets to a respective baseband transmission frame (BBFRAME) of a sequence of BBFRAMEs, in accordance with the required MODCODs for respective bits, such that each of the BBFRAMEs is associated with a highest common MODCOD robustness of the required MODCODs for each of the bits in the BBFRAME, wherein a robustness of a MODCOD associated with each of the BBFRAMEs increases or decreases in accordance with a chronological position in the sequence of BBFRAMEs, wherein the assigning of the bits of the plurality of data packets comprises:
        determining whether a BBFRAME has capacity to accommodate the bits of the plurality of data packets;
        when the BBFRAME has capacity, assigning the bits to the BBFRAME; and
        when the BBFRAME does not have capacity and a dwell time is not filled, assigning the bits to an adjacent BBFRAME in the sequence of BBFRAMEs; and
    determining a sequence of data packets of the plurality of data packets to be arranged within the sequence of BBFRAMEs in accordance with the assigning of the bits to the BBFRAMEs, and outputting the sequence of data packets to a buffer for arrangement as a transport stream comprising the sequence of BBFRAMEs,
    wherein the assigning of the bits to the BBFRAMES optimizes the sequence of data packets for transmission during the dwell time of a beam hopping schedule of a communications system using a predetermined number of symbols, and wherein a required MODCOD is contained within each data packet of the plurality of data packets.

2. The method according to claim 1, further comprising:
    determining that it is not possible to accommodate one or more additional bits of the plurality of data packets in the sequence of BBFRAMEs;
    determining that optimization of the sequence of BBFRAMEs is possible if an optimization limit is not exceeded, the optimization comprising:
        identifying further data packets to be transmitted during the dwell time at a second transmission rate higher than the first transmission rate;
        adding further BBFRAMEs to the sequence of BBFRAMEs within the dwell time; and assigning bits of the plurality of data packets and the further data packets to the sequence of BBFRAMEs and further BBFRAMEs, in accordance with the required MODCODs for the bits.

3. The method according to claim 2 comprising repeating the optimization until the optimization limit is reached.

4. The method according to claim 3, wherein the optimization limit is the bit-to-symbol conversion rate limit for the dwell time.

5. The method according to claim 3, wherein the optimization limit is a predetermined number of optimizations, if the bit-to-symbol conversion rate limit for the dwell time is not exceeded.

6. The method according to claim 1 comprising:
identifying the MODCOD of each BBFRAME;
preparing a transmission stream based on the sequence of data packets to be arranged in the sequence of BBFRAMEs and the MODCOD of each BBFRAME; and
transmitting the transmission stream.

7. The method according to claim 6, in which the order of the data packets in a BBFRAME is arbitrary.

8. An apparatus comprising one or more processors, and memory storing computer-executable instructions that, when executed by the one or more processors, causes the method of claim 1 to be performed.

9. A satellite payload comprising the apparatus of claim 8.

10. A non-transitory computer readable medium including a computer program which, when executed by a processor, is arranged to cause the method of claim 1 to be performed.

11. The method according to claim 1,
wherein bits from a particular data packet span a boundary of a respective BBFRAME.

12. The method according to claim 1, further comprising:
determining whether an optimization limit has been exceeded,
wherein it is presumed that the dwell time is not filled when the optimization limit has not been exceeded.

13. The method according to claim 12, wherein the optimization limit has been exceeded when a predetermined number of optimization iterations have been performed.

14. The method according to claim 12, wherein the optimization limit has been exceeded when the bit-to-symbol conversion rate limit has been exceeded.

15. The method according to claim 12, further comprising:
when the optimization limit has been exceeded, determining a sequence of data packets from an input buffer to be arranged within the BBFRAMEs.

* * * * *